(12) United States Patent
Matsumoto et al.

(10) Patent No.: US 10,719,440 B2
(45) Date of Patent: Jul. 21, 2020

(54) SEMICONDUCTOR DEVICE AND MEMORY ACCESS METHOD

(71) Applicant: RENESAS ELECTRONICS CORPORATION, Tokyo (JP)

(72) Inventors: Keisuke Matsumoto, Tokyo (JP); Seiji Mochizuki, Tokyo (JP); Hiroshi Ueda, Tokyo (JP); Katsushige Matsubara, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 66 days.

(21) Appl. No.: 16/057,713

(22) Filed: Aug. 7, 2018

(65) Prior Publication Data

US 2019/0095324 A1 Mar. 28, 2019

(30) Foreign Application Priority Data

Sep. 28, 2017 (JP) .................. 2017-187998

(51) Int. Cl.
*G06F 12/06* (2006.01)
*G06F 7/575* (2006.01)
*G06F 12/02* (2006.01)

(52) U.S. Cl.
CPC .............. *G06F 12/06* (2013.01); *G06F 7/575* (2013.01); *G06F 12/023* (2013.01); *G06F 2212/1024* (2013.01); *G06F 2212/1044* (2013.01); *G06F 2212/302* (2013.01); *G06F 2212/401* (2013.01); *G06F 2212/466* (2013.01)

(58) Field of Classification Search
CPC combination set(s) only.
See application file for complete search history.

(56) References Cited

U.S. PATENT DOCUMENTS 8,700,865 B1   4/2014   Van Dyke et al.
2010/0153658 A1   6/2010   Duncan et al.

FOREIGN PATENT DOCUMENTS

EP   3 185 127 A1   6/2017
JP   10-27127 A   1/1998
WO   2015/142341 A1   9/2015

OTHER PUBLICATIONS

Extended European Search Report issued in corresponding European Patent Application No. 18193010.8-1221, dated Feb. 22, 2019.

*Primary Examiner* — Yong J Choe
(74) *Attorney, Agent, or Firm* — McDermott Will & Emery LLP (57) ABSTRACT

Regarding association between an area where compressed data is stored and an area where auxiliary information required to access the compressed data is stored, it is necessary to manage the association by software for each processing unit, so that the processing becomes complicated. A management unit memory area including a compressed data storage area and an auxiliary information storage area including auxiliary information are defined on a memory space. By calculating an auxiliary information address from an address indicating a location on a memory where a management unit memory space is set, an address of the auxiliary information storage area, and an address of the compressed data, the compressed data and the auxiliary information are associated with each other and the auxiliary information is read.

14 Claims, 11 Drawing Sheets

SEMICONDUCTOR DEVICE AND MEMORY ACCESS METHOD

CROSS-REFERENCE TO RELATED APPLICATIONS

The disclosure of Japanese Patent Application No. 2017-187998 filed on Sep. 28, 2017 including the specification, drawings and abstract is incorporated herein by reference in its entirety.

BACKGROUND

The present invention relates to a semiconductor device and a memory access method, and for example, relates to a semiconductor device and a memory access method which store compressed data into an external memory.

In recent years, a semiconductor device that performs various arithmetic processing such as image processing is widely used. When such a semiconductor device writes and reads data such as an image to and from a memory, the semiconductor device compresses and decompresses the data. As a technique related to reading compressed data, for example, Japanese Unexamined Patent Application Publication No. Hei 10(1998)-27127 (Patent Document 1) is known.

In Japanese Unexamined Patent Application Publication No. Hei 10(1998)-27127, when the compressed data is stored in a memory, address information of the memory where the compressed data is stored is stored in the memory through a bus as auxiliary information used to read the compressed data. When reading the compressed data from the memory, the compressed data is read by using the address information.

SUMMARY

However, in the Japanese Unexamined Patent Application Publication No. Hei 10(1998)-27127, the compressed data and the address information corresponding to the compressed data are associated with each other by paging control, so that it is required to manage an area where the compressed data is stored and a page table by associating both the area and the page table with each other. Therefore, there is a problem that processing by software becomes complicated when reading/writing the compressed data.

The other problems and novel features will become apparent from the description of the present specification and the accompanying drawings.

According to an embodiment, a management unit memory area that includes and stores a compressed data storage area and an auxiliary information storage area that includes and stores auxiliary information required when reading/writing the compressed data from/to a memory are set on a memory space, and the auxiliary information is read.

According to the embodiment, it is possible to reduce a processing amount of software required when reading the auxiliary information and reduce a processing time required for calculation.

DETAILED DESCRIPTION

Hereinafter, embodiments will be described in detail with reference to the drawings. The following embodiments will be explained, divided into plural sections or embodiments, if necessary for convenience. Except for the case where it shows clearly in particular, they are not mutually unrelated and one has relationships such as a modified example, details, and a supplementary explanation of some or entire of another.

In the following embodiments, when referring to the number of elements, etc. (including the number, a numeric value, an amount, a range, etc.), they may be not restricted to the specific number but may be greater or smaller than the specific number, except for the case where they are clearly specified in particular and where they are clearly restricted to a specific number theoretically. Further, in the following embodiments, it is needless to say that an element (including an element step etc.) is not necessarily indispensable, except for the case where it is clearly specified in particular and where it is considered to be clearly indispensable from a theoretical point of view, etc. Similarly, in the following embodiments, when shape, position relationship, etc. of an element etc. are referred to, what resembles or is similar to the shape, etc. substantially shall be included, except for the case where it is clearly specified in particular and where it is considered to be clearly not right from a theoretical point of view. This statement also applies to the numeric value and range described above.

First Embodiment

<<Schematic Configuration of Semiconductor Device>>

Figure 1:
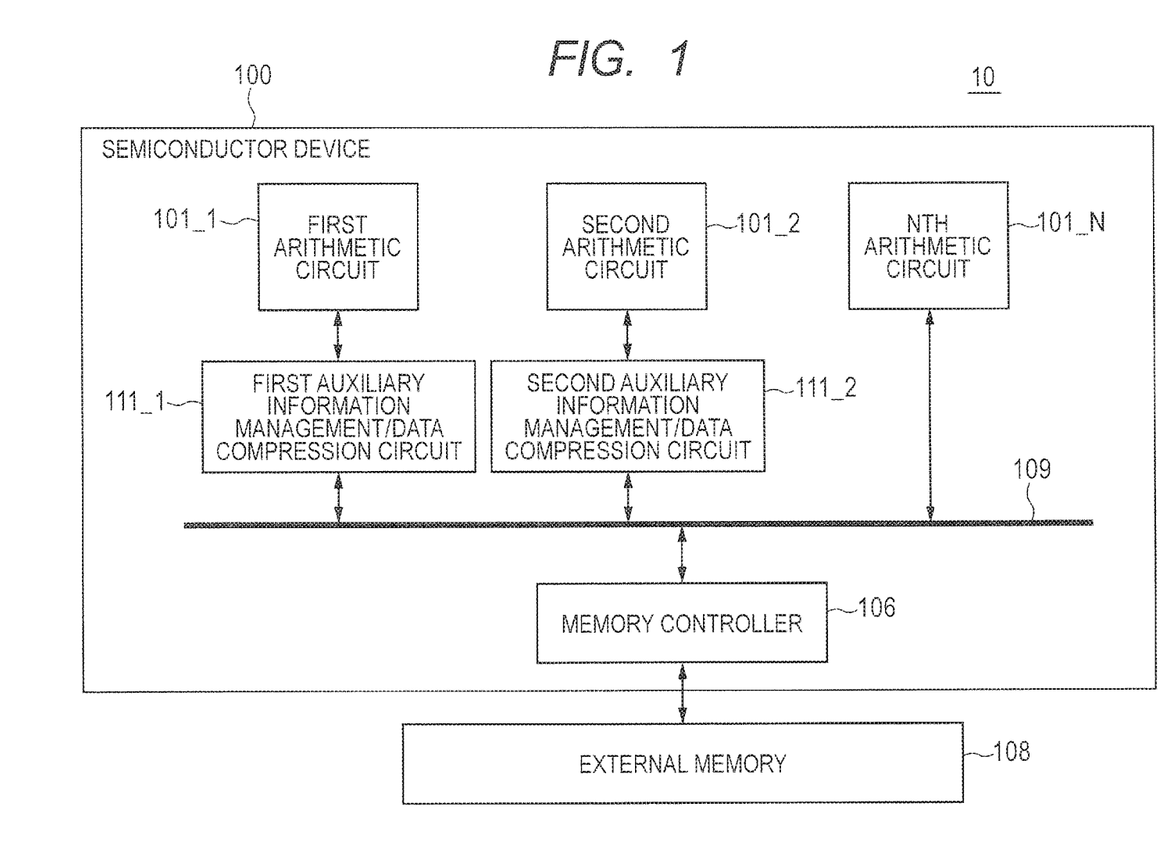
FIG. 1 is a schematic diagram showing a configuration of a semiconductor system according to a first embodiment.

FIG. 1 is a schematic diagram showing a configuration of a semiconductor system according to a first embodiment. A semiconductor system 10 shown in FIG. 1 is composed of, for example, a semiconductor device 100 including a first arithmetic circuit 101_1, a second arithmetic circuit 101_2, . . . , an Nth arithmetic circuit 101_N, a first auxiliary information management/data compression circuit 111_1, a second auxiliary information management/data compression circuit 111_2, and so on, a bus 109, a memory controller 106, and the like, and an external memory 108. The external memory 108 is composed of a semiconductor storage device such as SDRAM (Synchronous Dynamic Random Access Memory). The first auxiliary information management/data compression circuit 111_1 generates auxiliary information necessary to perform read/write from/to compressed data for an access to the compressed data issued from the first arithmetic circuit 101_1 and performs compression processing on data generated by the first arithmetic circuit 101_1. Similarly, the second auxiliary information management/data compression circuit 111_2 performs processing such as generation of auxiliary information and data compression on an access issued from the second arithmetic circuit 101_2 and data generated by the second arithmetic circuit 101_2. An auxiliary information management/data compression circuit such as the first auxiliary information management/data compression circuit 111_1 and the second auxiliary information management/data compression circuit 111_2 need not be provided to all arithmetic circuits, and an arithmetic circuit may be directly coupled to the bus 109 without providing the auxiliary information management/data compression circuit like the Nth arithmetic circuit 101_N. Although FIG. 1 shows two auxiliary information management/data compression circuits, it is possible to provide two or more auxiliary information management/data compression circuits or two or less auxiliary information management/data compression circuits.

Figure 2:
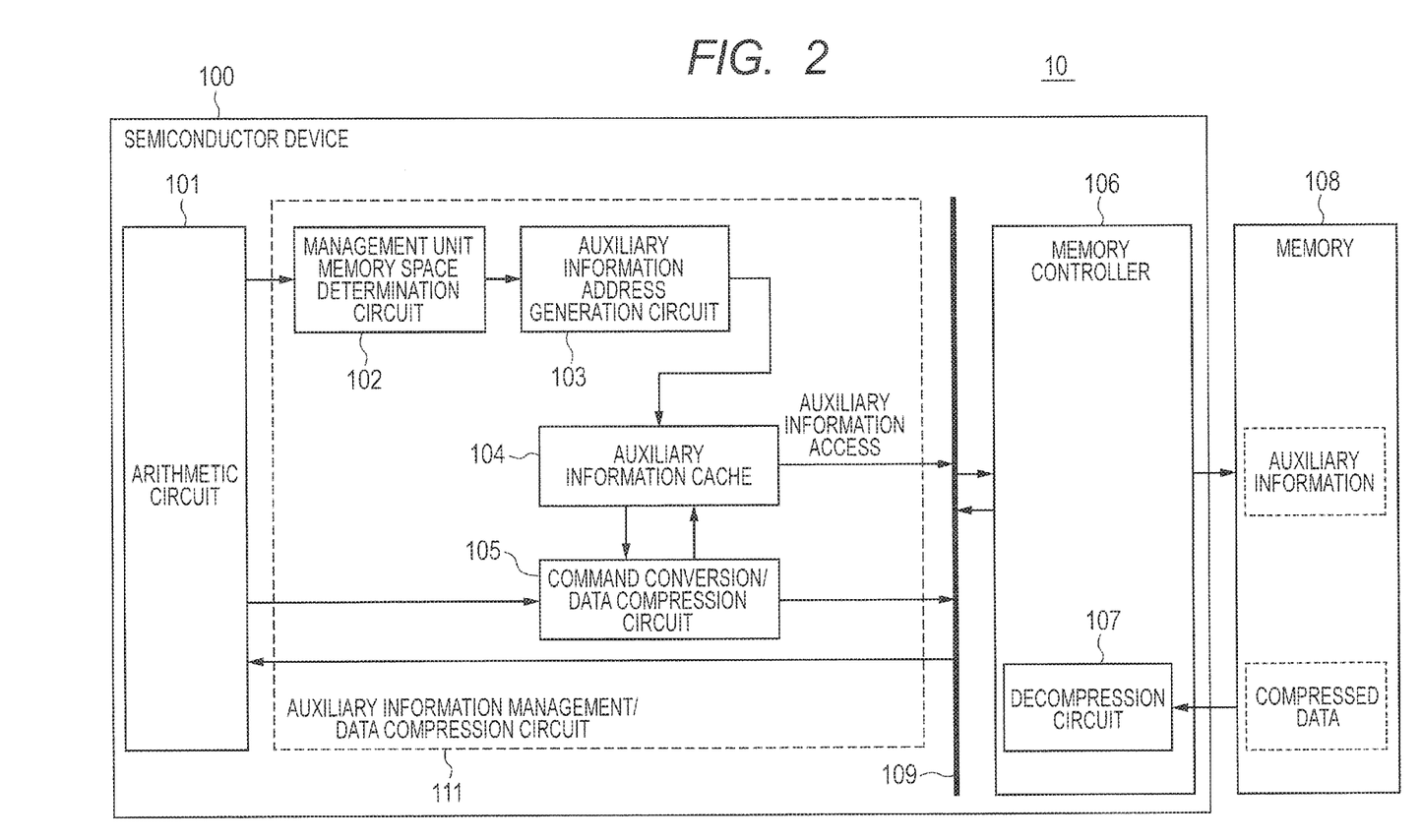
FIG. 2 is a schematic diagram showing a configuration of the semiconductor system according to the first embodiment.

FIG. 2 is a detailed diagram showing a configuration example of the semiconductor system focused on the first arithmetic circuit 101_1 and the first auxiliary information management/data compression circuit 111_1 in FIG. 1. The semiconductor system 10 has a configuration where the semiconductor device 100 including an arithmetic circuit 101, an auxiliary information management/data compression circuit 111, and a memory controller 106 having a decompression circuit 107, and an external memory (hereinafter simply referred to as "memory") 108 are mounted.

The auxiliary information management/data compression circuit 111 corresponds to the first auxiliary information management/data compression circuit 111_1 and the second auxiliary information management/data compression circuit 111_2 in FIG. 1 and internally includes a management unit memory space determination circuit 102, an auxiliary information address generation circuit 103, an auxiliary information cache 104, and a command conversion/data compression circuit 105.

The arithmetic circuit 101 corresponds to the first arithmetic circuit 101_1, the second arithmetic circuit 101_2, . . . , and the Nth arithmetic circuit 101_N in FIG. 1 and performs predetermined processing according to a user. Although the arithmetic circuit 101 is realized by, for example, a CPU (Central Processing Unit), the arithmetic circuit 101 may be a specific processing arithmetic circuit that receives an instruction for specific processing from a CPU and performs the processing.

The management unit memory space determination circuit 102 determines into which management unit memory space an access to the memory 108 issued from the arithmetic circuit 101 is an access. The management unit memory space is a memory space that is set so as to internally contain compressed data, and an area of the memory space is set by the arithmetic circuit or the like. The details of the management unit memory space will be described later.

When the access is an access to compressed data, the auxiliary information address generation circuit 103 generates an address (hereinafter written as an auxiliary information address) at which auxiliary information corresponding to the compressed data is stored. The auxiliary information indicates information required when reading/writing compressed data from/to the memory 108 and, for example, indicates a data size after compression. When data is compressed, the data size is reduced, so that information of the data size after compression is required to read/write the data after compression. Therefore, when the auxiliary information address generation circuit 103 reads compressed data from the memory 108, the auxiliary information address generation circuit 103 generates an auxiliary information address from an access address to the compressed data or the like and outputs the auxiliary information address to the command conversion/data compression circuit 105.

Both the auxiliary information and the compressed data are stored on the memory 108. When reading the compressed data, an operation is required which first reads the auxiliary information from the memory 108, converts a read request of the compressed data based on the read auxiliary information, and reads the compressed data based on the converted read request. On the other hand, when writing the compressed data, data is compressed first, the auxiliary information is generated based on the data size after compression, and the compressed data is stored in the memory 108. The auxiliary information is stored in the auxiliary information cache 104, and after a certain amount of auxiliary information is stored in the auxiliary information cache 104, the auxiliary information is stored in the memory 108.

The auxiliary information cache 104 is a cache that stores the auxiliary information. The auxiliary information is used by the command conversion/data compression circuit 105 for read/write request conversion of compressed data, and thereafter stored in the auxiliary information cache 104. Even when a request for the same compressed data is subsequently issued, if the auxiliary information corresponding to the compressed data is stored in the auxiliary information cache 104 in advance, it is possible to convert a read/write request for the compressed data without reading the compressed data from the memory 108. Although it is possible to read/write the auxiliary information even when there is no auxiliary information cache 104, it is possible to realize more efficient access by providing the auxiliary information cache 104.

The command conversion/data compression circuit 105 compresses data generated from the arithmetic circuit 101 and generates data size information of the compressed data. The generated data size information is stored in the auxiliary information cache 104 or the memory 108 as the auxiliary information. Further, the command conversion/data compression circuit 105 issues a read/write request for the compressed data. A read/write request outputted from the arithmetic circuit 101 to the command conversion/data compression circuit 105 has a request content to read/write data having a data size before compression, so that the read/write request cannot be directly outputted to the memory controller 106. Therefore, it is necessary to rewrite the content of request so as to read/write data having a data size after compression by using the auxiliary information that is the data size information after compression.

The memory controller 106 receives a read/write request for the compressed data generated by the command conversion/data compression circuit 105 and transfers data between the semiconductor device 100 and the memory 108.

The memory 108 is a memory provided outside the semiconductor device 100 and stores the compressed data and the auxiliary information.

The decompression circuit 107 decompresses the compressed data read from the memory 108 and supplies the decompressed data to the arithmetic circuit 101. Although the decompression circuit 107 is provided inside the memory controller 106 In FIG. 2, the decompression circuit 107 may be provided inside the auxiliary information management/data compression circuit 111. When the decompression circuit 107 is provided inside the memory controller 106, a plurality of arithmetic circuits 101 can commonly use one decompression circuit 107, so that it is possible to reduce the number of the decompression circuits 107, and thereby a circuit area can be reduced. When the decompression circuit 107 is provided in each of a plurality of the auxiliary information management/data compression circuits 111, the circuit area increases. However, data can pass through an internal bus in a compressed state, so that transaction in the internal bus can be reduced.

Comparative Example

Here, before the description of an operation of the semiconductor device of the first embodiment, a semiconductor device related to a technique (hereinafter referred to as a comparative example) studied as a premise of the semiconductor device of the first embodiment will be described.

Figure 7:
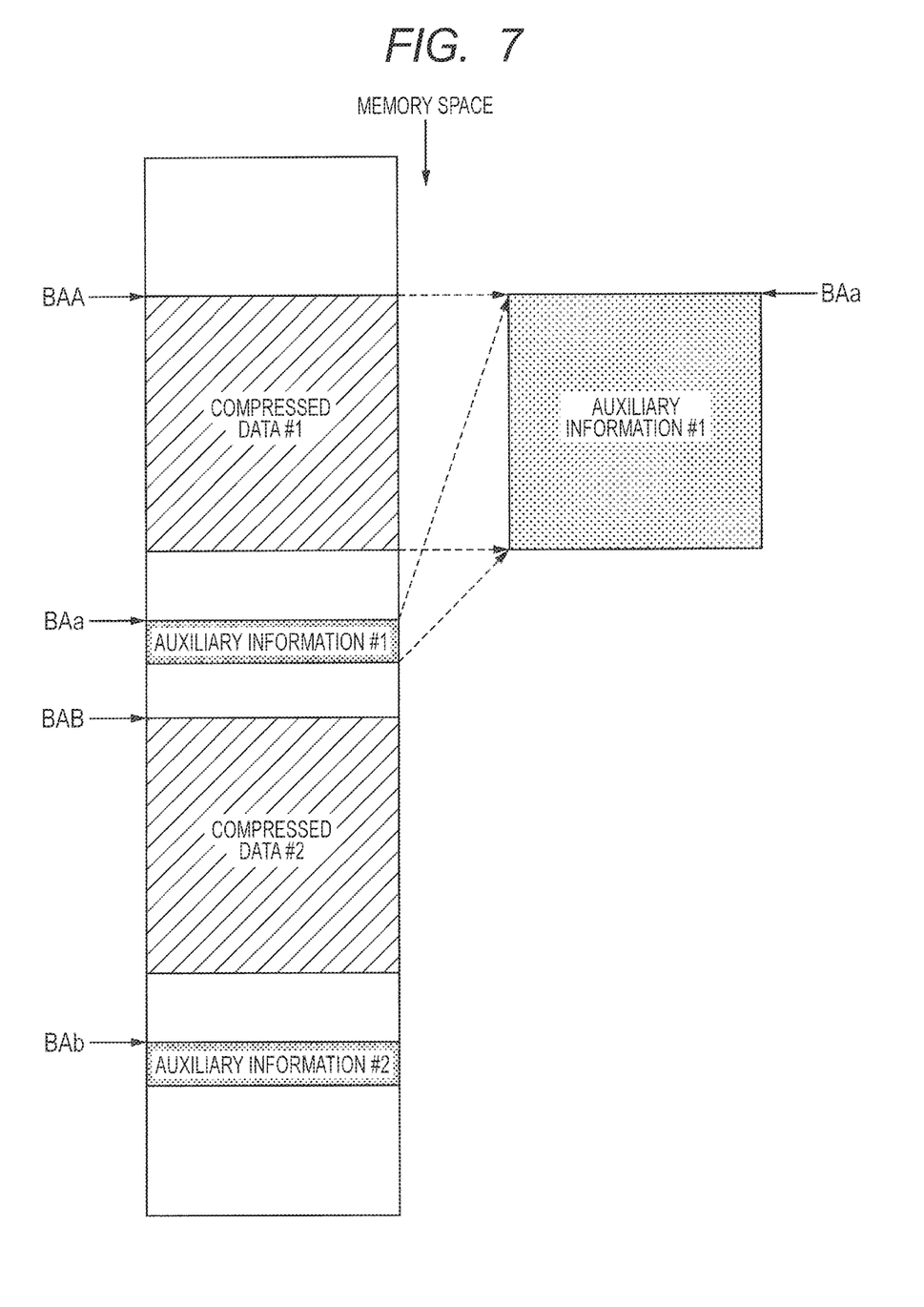
FIG. 7 is a diagram showing an address space according to a comparative example.

FIG. 7 is a diagram showing a memory space related to the comparative example. The vertical axis means the memory space. On the memory space, compressed data and auxiliary information corresponding to the compressed data are stored. In FIG. 7, as an illustrative example, compressed data #1 and auxiliary information #1 corresponding to the compressed data #1 are stored in association with each other, and compressed data #2 and auxiliary information #2 corresponding to the compressed data #2 are stored in association with each other.

Each compressed data is collected for each arithmetic unit (operation) of an arithmetic circuit and stored. The arithmetic unit means processing of unit whose start address of addresses where data is stored. For example, in moving image encoding processing, luminance processing and color difference processing correspond to the arithmetic unit. The luminance processing and the color difference processing in the moving image encoding processing or the moving image decoding processing are independently processed respectively, and an access occurs for an address calculated based on a different base address for each processing. For example, data used by an operation #1 that performs the luminance processing is compressed and stored in an area of compressed data #1, and data used by an operation #2 that performs the color difference processing is compressed and stored in an area of compressed data #2. Then, auxiliary information for reading the compressed data stored in the area of compressed data #1 is stored in an area of auxiliary information #1, and auxiliary information for reading the compressed data stored in the area of compressed data #2 is stored in an area of auxiliary information #2.

In the comparative example, for an association between the compressed data and the auxiliary information corresponding to the compressed data, software is required to manage a base address for each operation and a base address of the auxiliary information. In other words, a base address (BAA) of the operation #1 and a base address (BAa) of the auxiliary information #1 corresponding to the compressed data #1 used in the operation #1 are required to be associated with each other and managed by software.

Description of Embodiments

Hereinafter, a semiconductor device according to embodiments will be described.

Figure 3:
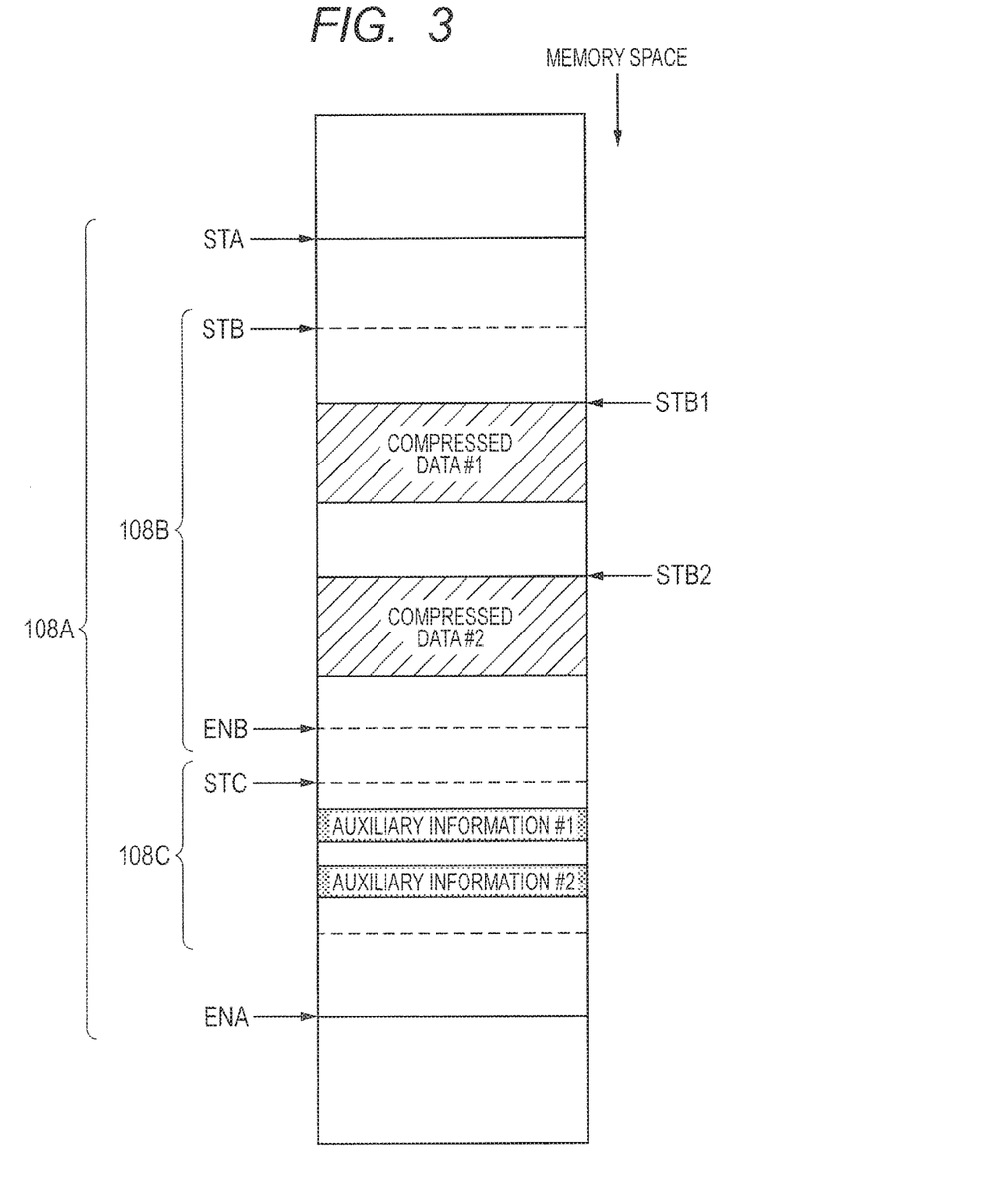
FIG. 3 is a diagram showing an address space according to the first embodiment.

FIG. 3 is a diagram showing an address space according to the first embodiment. The vertical axis means the memory space. On the memory space, compressed data and auxiliary information corresponding to the compressed data are stored. As an illustrative example, compressed data #1, which is first compressed data, and auxiliary information #1, which is first auxiliary information, corresponding to the compressed data #1 are stored in association with each other, and compressed data #2 and auxiliary information #2 corresponding to the compressed data #2 are stored in association with each other. Each compressed data is collected for each arithmetic unit (operation) of an arithmetic circuit and stored. In the present embodiment, further, a management unit memory space 108A that is set so as to contain a plurality of pieces of compressed data, a compressed data storage area 108B which is an area that stores the compressed data contained in the management unit memory space 108A, and an auxiliary information storage area 108C where auxiliary information corresponding to the compressed data is stored are set. The management unit memory space 108A is allocated in the memory 108.

The compressed data storage area 108B is an area that can store compressed data, and a plurality of compressed data are stored in the compressed data storage area 108B. The compressed data storage area 108B is set by an arithmetic circuit such as a CPU. Setting values of a start (starting point) address (STB) and an end (ending point) address (ENB) are stored in a register (not shown in the drawings) located inside the auxiliary information address generation circuit 103.

The auxiliary information storage area 108C is an area that can store auxiliary information, and a plurality of pieces of auxiliary information are stored in the auxiliary information storage area 108C. In FIG. 3, the auxiliary information #1 corresponding to the compressed data #1 and the auxiliary information #2 corresponding to the compressed data #2 are stored. In a register (not shown in the drawings) located inside the auxiliary information address generation circuit 103, a correspondence relationship between an address indicating a location on a memory where a management unit memory space is set and a start address (STC) of the auxiliary information storage area 108C that stores auxiliary information corresponding to compressed data stored in the management unit memory space is set. Therefore, when determining which management unit memory space stores compressed data, it is possible to calculate an address of the auxiliary information storage area 108C where auxiliary information corresponding to the compressed data is stored from a value of the register. The auxiliary information storage area 108C need not necessarily be located inside a management unit memory space where a corresponding compressed data storage area 108B is located, but may be located outside the management unit memory space.

The management unit memory space 108A is an area that is set to associate compressed data with auxiliary information. The management unit memory space 108A is set so as to include the compressed data storage area 108B. A plurality of management unit memory spaces 108A may be set on a memory, or only one management unit memory space 108A may be set on the memory. As an example, the management unit memory space 108A is set by a value of upper several bits of memory address. For example, when the memory address is set by 40 bits and the management unit memory space 108A is set by upper eight bits of memory address, each management unit memory space is a space of 32 bits 4 gigabytes and there are up to 256 management unit memory spaces. The management unit memory space determination circuit 102 receives an address for accessing compressed data, which is issued from the arithmetic circuit 101, decodes upper several bits of the address, and determines on which management unit memory space the compressed data is stored. The management unit memory space may be set not only by the method using the value of upper bits, but also by separately setting a start address and an end address. Further, the methods for setting the management unit memory space are not limited to the methods described above if the methods for setting the management unit memory space are set so as to contain a plurality of pieces of compressed data.

<Description of Operation>

FIGS. 5A and 5B and FIGS. 6A and 6B are diagrams for explaining operation flows when the arithmetic circuit issues a read request and a write request, respectively. An operation of the semiconductor device according to the first embodiment will be described with reference to the operation flows.

Figure 5A:
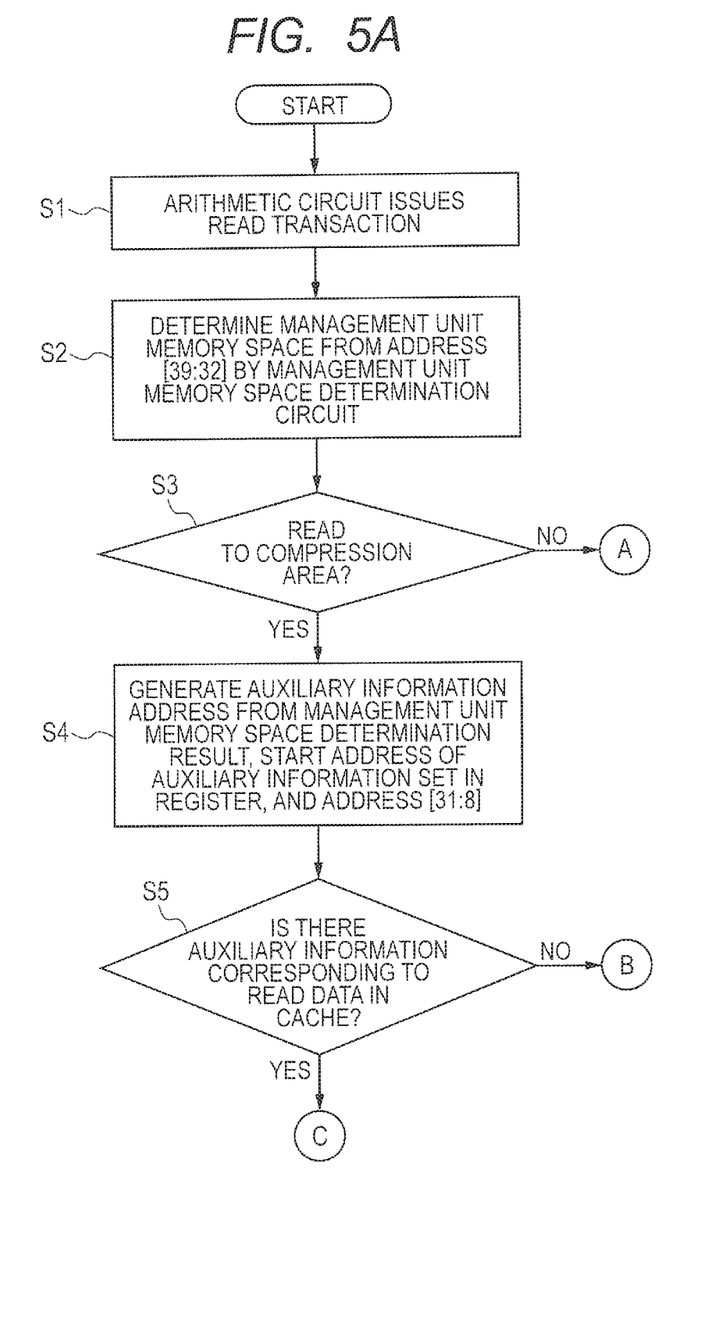
FIG. 5A is a diagram showing a read operation flow according to the first embodiment.
Figure 5B:
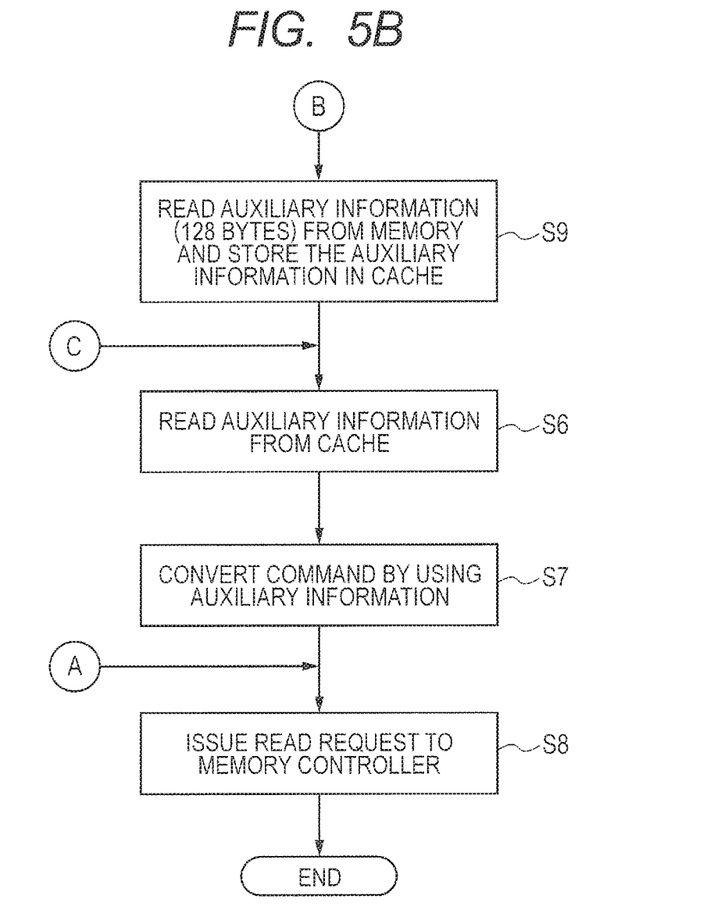
FIG. 5B is a diagram showing a read operation flow according to the first embodiment.

FIGS. 5A and 5B are diagrams showing an operation when a read request is issued from the arithmetic circuit to compressed data. When the arithmetic circuit 101 issues a read request (read transaction) to the memory 108 (step S1), the management unit memory space determination circuit 102 that receives the read request determines in which management unit memory space a read destination address is located from address upper bits (for example, bits 32 to 39) (step S2). After the management unit memory space that includes the read destination address is determined, the auxiliary information address generation circuit 103 determines whether the read destination address is an access into the compressed data storage area 108B (step S3). When the read destination address is an access into the compressed data storage area 108B of the memory 108, the auxiliary information address generation circuit 103 drives the start address (STC) of the auxiliary information storage area 108C corresponding to the compressed data from a determination result of the management unit memory space determination circuit 102, and generates an auxiliary information address by using the start address (STC) and the read destination address (for example, bits 8 to 31) (step S4). It is also possible to determine whether or not to use the auxiliary information address by (reversing the order of step S3 and step S4) generating the auxiliary information address regardless of whether or not data is compressed data and thereafter determining whether the access destination is compressed data and determining whether or not to use the auxiliary information address.

Hereinafter, an operation to generate the auxiliary information address will be described.

Let us return to the description of FIG. 3. As shown in FIG. 3, the management unit memory space 108A is set so as to contain the compressed data storage area 108B. Further, the auxiliary information storage area 108C is set so as to contain a plurality of pieces of auxiliary information.

Figure 4:
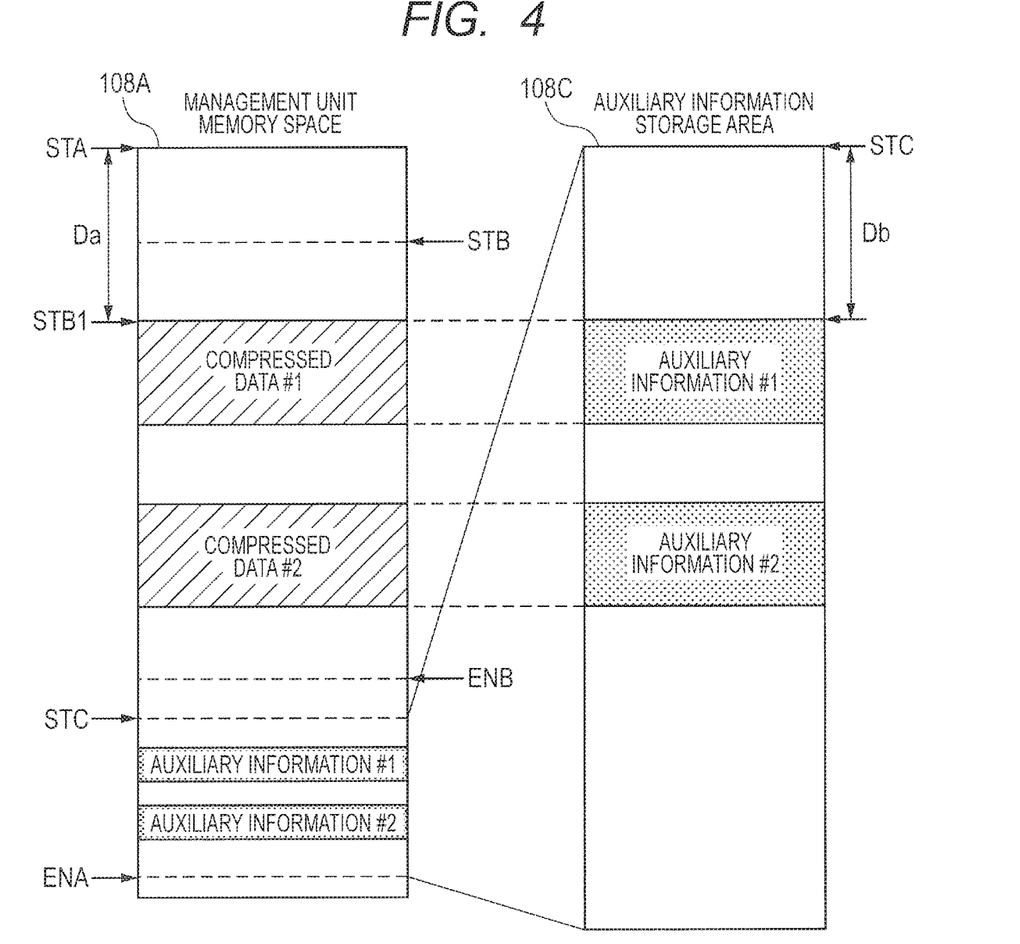
FIG. 4 is a diagram showing a correspondence relationship between a management unit memory space and an auxiliary information storage area in the address space according to the first embodiment.

FIG. 4 is a diagram showing a correspondence relationship between the management unit memory space 108A and the auxiliary information storage area 108C. An example where the compressed data #1 is read will be described with reference to FIG. 4.

First, the auxiliary information address generation circuit 103 acquires a start address (STA) of the management unit memory space 108A where compressed data to be accessed exists from a determination result of the management unit memory space determination circuit 102. Then, the auxiliary information address generation circuit 103 calculates a difference value (distance of Da in FIG. 4) between an address of base, which is the start address (STA) of the management unit memory space 108A, and an address (STB1) of the compressed data #1.

At present, it is assumed that the size of the auxiliary information is 1/M times the size of the original compressed data (M is a constant and M is a data size ratio between the compressed data and the auxiliary information). Therefore, the size of an area where the compressed data is stored is M times the size of an area where the auxiliary information is stored. In the present embodiment, an order in which a plurality of pieces of compressed data are stored is the same as an order in which a plurality of corresponding pieces of auxiliary information are stored. Therefore, an Nth piece of compressed data contained in the management unit memory space 108A corresponds to an Nth piece of auxiliary information contained in the auxiliary information storage area 108C. Therefore, it is possible to calculate an address of the auxiliary information #1 (first auxiliary information address) by using the difference value (distance of Da in FIG. 4) between the start address (STA) of the management unit memory space and the address of the compressed data #1 and the start address (STC) of the auxiliary information storage area 108C. This is because the size of the auxiliary information is 1/M times the size of the compressed data, so that when the distance of Da, which is the difference value between the base address and the address of the compressed data #1, is obtained, a value obtained by multiplying the distance of Da by 1/M is a difference value (distance of Db in FIG. 4) between the start address (STC) of the auxiliary information storage area 108C and the address of the auxiliary information #1. Therefore, it is possible to calculates the address of the auxiliary information #1 by adding a value obtained by multiplying the difference value between the start address (STA) of the management unit memory space 108A and the address of the compressed data #1 by 1/M to the start address (STC) of the auxiliary information storage area 108C. At this time, the compressed data and the auxiliary information are stored so that a relative storage position of the compressed data in the management unit memory space 108A and a relative storage position of the auxiliary information corresponding to the compressed data in the auxiliary information storage area 108C are coincident with each other.

As described above, by using the start address (STA) of the management unit memory space as a base, a difference value between the address of the base and the address of the compressed data #1 is calculated, and an address value of the auxiliary information #1 is obtained by adding a value calculated by multiplying the difference value by 1/integer to the start address (STC) of the auxiliary information storage area 108C. At this time, a relative storage position of the compressed data when seeing the relative storage position inside a management unit memory space unit and a relative storage position of the auxiliary information corresponding to the compressed data when seeing the relative storage position inside an auxiliary information storage area unit are the same. In other words, it can be said that the auxiliary information storage area is an area obtained by reducing the data size of the management unit memory space to 1/M and the compressed data that is managed and stored is replaced by the auxiliary information corresponding to the compressed data.

In this way, it is possible to calculate the address of the auxiliary information from the read destination address of the compressed data. In other words, it is possible to associate the compressed data with the auxiliary data by using only the address indicating the location on the memory where the management unit memory space is set, the start address of the auxiliary information storage area, and the read destination address of the compressed data. Therefore, control such as paging need not be performed, so that it is possible to reduce a processing amount of software and reduce a processing time.

Let us return to the description of FIG. 5A. After generating the auxiliary information address as described above (step S4), the auxiliary information address generation circuit 103 checks whether the auxiliary information corresponding to the generated auxiliary information address exists in the auxiliary information cache 104 (step S5). When the corresponding auxiliary information exists in the auxiliary information cache 104 (YES in step S5), the auxiliary information is read from the auxiliary information cache 104 (step S6) as shown in FIG. 5B, the command conversion/data compression circuit 105 converts content of a read request by using the auxiliary information (step S7), and the read request is issued to the memory controller 106 (step S8). When the auxiliary information corresponding to the generated auxiliary information address is not included in the auxiliary information cache 104 (NO in step S5), the auxiliary information (for example, 128 bytes) is read from the memory 108 by using the auxiliary information address and then the auxiliary information is stored in the auxiliary information cache 104 (step S9).

In step S3, when the read destination address is a read request to outside a compressed data area (NO in step S3), the auxiliary information address generation circuit 103 does not generate auxiliary information, and the read request issued from the arithmetic circuit 101 is outputted to the memory controller 106 without being converted.

When there is no auxiliary information cache 104, after the auxiliary information address generation circuit 103 generates the auxiliary information address (step S4), the auxiliary information is read from the memory 108 without accessing the auxiliary information cache 104, and a command is converted by using the read auxiliary information (step S7).

Figure 6A:
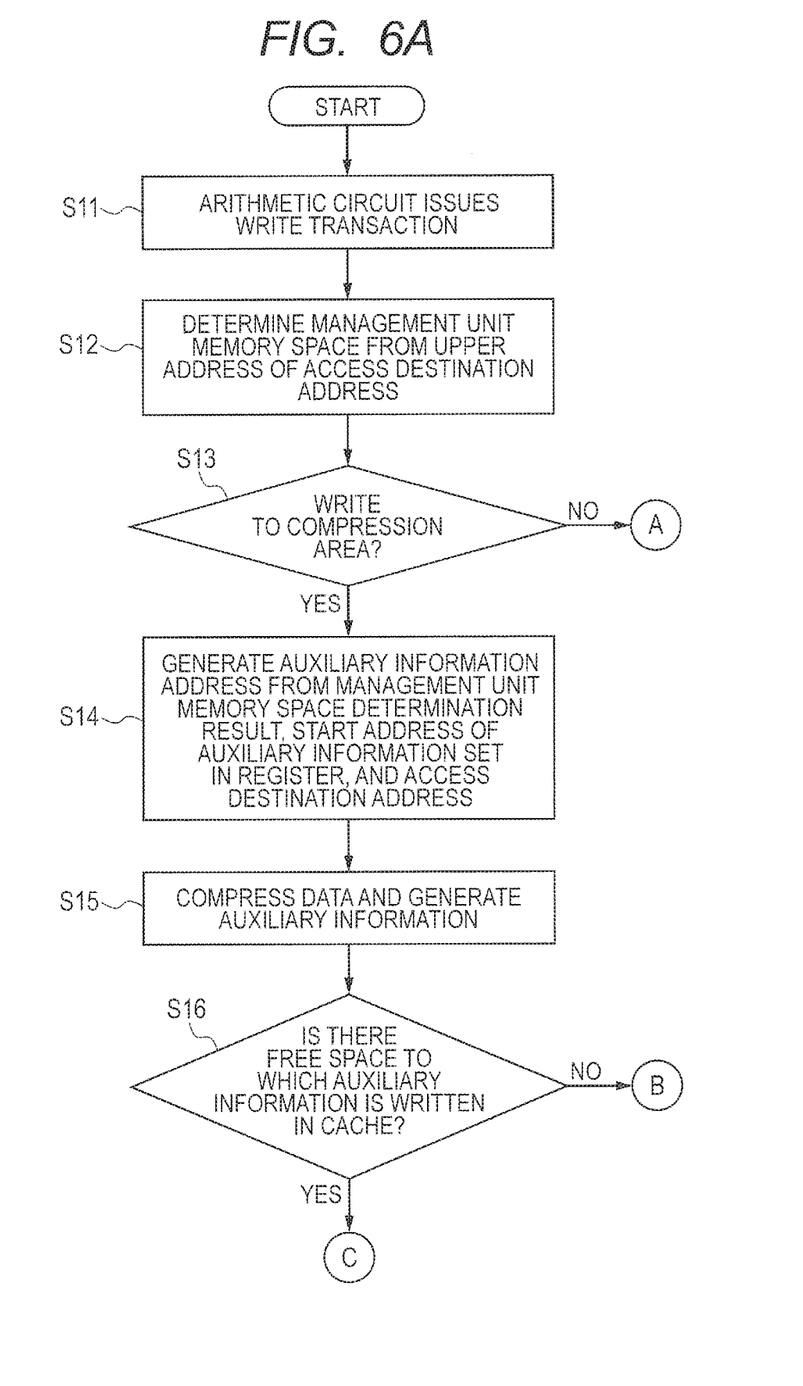
FIG. 6A is a diagram showing a write operation flow according to the first embodiment.
Figure 6B:
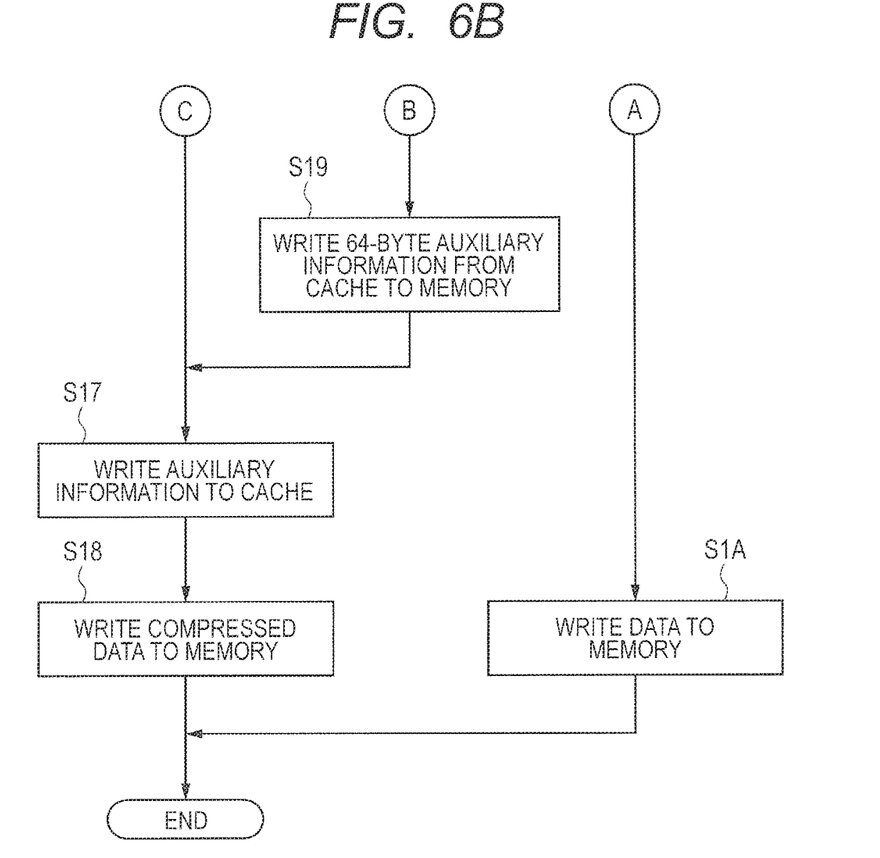
FIG. 6B is a diagram showing a write operation flow according to the first embodiment.

FIGS. 6A and 6B are diagrams showing an operation when a write request is issued from the arithmetic circuit to the memory. Steps S11 to S14 are the same as steps S1 to S4 of the read request, so that the description thereof will be omitted.

When the write request is write to the compressed data storage area 108B in step S13 (YES in step S13), an auxiliary information address is generated in step S14, and thereafter data is compressed and auxiliary information corresponding to the data is generated (step S15). The generated auxiliary information is stored in the auxiliary information cache 104 and thereafter stored in the memory 108. However, in order to store more auxiliary information into the memory 108 by one-time memory access, after storing the auxiliary information of maximum size (for example, 64 bytes), which can be transferred to the memory 108 by one-time operation, into the auxiliary information cache 104, the stored auxiliary information is collectively written to the memory 108. Therefore, after the auxiliary information is generated, when there is no free space to write the auxiliary information in the auxiliary information cache 104 (NO in step S16), that is, when the auxiliary information of maximum size which can be transferred to the memory 108 by one-time operation has already been stored, the auxiliary information that has already been stored is written to the memory 108 (step S19) as shown in FIG. 6B and the newly generated auxiliary information is written to free space in the auxiliary information cache 104 (step S17). After the auxiliary information is stored in the auxiliary information cache 104, compressed data is written to the memory 108 (step D18). On the other hand, when there is free space to write the auxiliary information in the auxiliary information cache 104 (YES in step S16), the auxiliary information is written to the auxiliary information cache 104 (step S17), and transfer of the auxiliary information to the memory 18 is stopped until the auxiliary information of maximum size which can be transferred to the memory 108 by one-time operation is stored.

The auxiliary information address that is generated when the auxiliary information is written to the memory 108 is generated from the address indicating the location on the memory where the management unit memory space is set and the start address (STC) of the auxiliary information storage area 108C in the same manner as when the auxiliary information is read.

As described above, in the first embodiment, the management unit memory space 108A that includes the compressed data storage area 108B and the auxiliary information storage area 108C that includes the auxiliary information are set, and the auxiliary information address is calculated from the address indicating the location on the memory where the management unit memory space 108A is set, the start address (STC) of the auxiliary information storage area 108C, and the storage address of the compressed data. Thereby, it is possible to lighten the processing required to associate the compressed data with the auxiliary information and reduce a processing amount of software and a processing time required for calculation.

Second Embodiment

Figure 8:
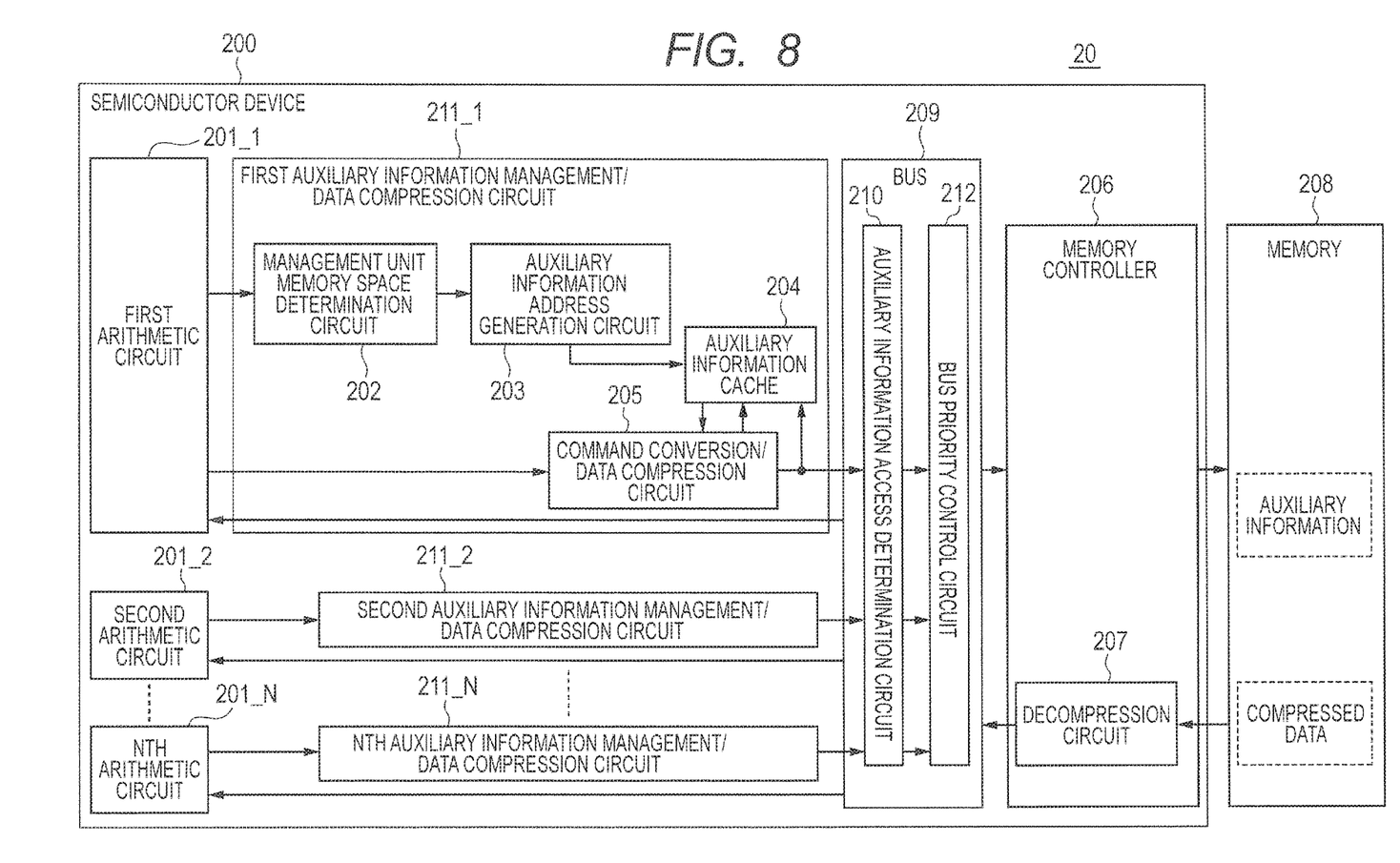
FIG. 8 is a diagram showing a configuration of a semiconductor system according to a second embodiment.

FIG. 8 is a diagram showing a configuration of a semiconductor system according to a second embodiment. The semiconductor system 20 shown in FIG. 8 includes a semiconductor device 200 and a memory 208. The semiconductor device 200 includes a first arithmetic circuit 201_1, a second arithmetic circuit 201_2, . . . , an Nth arithmetic circuit 201_N, a first auxiliary information management/data compression circuit 211_1, a second auxiliary information management/data compression circuit 211_2, . . . , an Nth auxiliary information management/data compression circuit 211_N, a bus 209, and a memory controller 206 having a decompression circuit 207. The bus 209 includes an auxiliary information access determination circuit 210 and a bus priority control circuit 212. The second embodiment is different from the first embodiment in that the auxiliary information access determination circuit 210 and the bus priority control circuit 212 are newly provided to the bus 209. The auxiliary information access determination circuit 210 receives an access address from the first arithmetic circuit 201_1, the second arithmetic circuit 201_2, . . . , and the Nth arithmetic circuit 201_N, and determines whether or not an access destination is an address of auxiliary information. When the auxiliary information access determination circuit 210 determines that the access destination is auxiliary information, the bus priority control circuit 212 performs arbitration to raise the priority of the access.

Each of the first auxiliary information management/data compression circuit 211_1 to the Nth auxiliary information management/data compression circuit 211_N has a management unit memory space determination circuit 202, an auxiliary information address generation circuit 203, an auxiliary information cache 204, and a command conversion/data compression circuit 205. Hereinafter, the first auxiliary information management/data compression circuit 211_1 will be described. However, the same goes for the second auxiliary information management/data compression circuit 211_2 to the Nth auxiliary information management/data compression circuit 211_N.

The management unit memory space determination circuit 202 determines an access destination management unit memory space by using, for example, upper bits of an address, and outputs a determination result to the auxiliary information address generation circuit 203.

The auxiliary information address generation circuit 203 calculates the start address (STC) of the auxiliary information storage area 108C where the auxiliary information corresponding to access destination compressed data is stored from the determination result from the management unit memory space determination circuit 202 and generates an auxiliary information address. Then, the auxiliary information address generation circuit 203 outputs the generated auxiliary information address to the auxiliary information cache 204.

When the access is a read access, the auxiliary information cache 204 checks whether the auxiliary information that is stored at the auxiliary information address outputted from the auxiliary information address generation circuit 203 is stored inside the auxiliary information cache 204. When there is the corresponding auxiliary information, the auxiliary information is outputted to the command conversion/data compression circuit 205 and the compressed data is read, and when there is no corresponding auxiliary information, the auxiliary information is read from the memory 208. At this time, the command conversion/data compression circuit 205 issues a read request for the auxiliary information. When the access is a write access, the command conversion/data compression circuit 205 writes compressed data into the memory 208 and further writes the auxiliary information generated when compression is performed into the auxiliary information cache 204. The auxiliary information written into the auxiliary information cache 204 is managed in association with the auxiliary information address generated by the auxiliary information address generation circuit 203.

The command conversion/data compression circuit 205 performs command conversion and data compression processing. The first arithmetic circuit 201_1 outputs data to the command conversion/data compression circuit 205. The command conversion/data compression circuit 205 compresses the data outputted from the first arithmetic circuit 201_1 and outputs a data length after the compression to the auxiliary information cache 204 as auxiliary information. Further, the command conversion/data compression circuit 205 converts content of the read request so as to read only the data length after the compression based on a compressed data length which is auxiliary information.

The auxiliary information access determination circuit 210 receives an access address from the first arithmetic circuit 201_1 to the Nth arithmetic circuit 201_N and determines whether or not the access address is an access to the auxiliary information.

When it is determined that a determination result from the auxiliary information access determination circuit 210 is an access to the auxiliary information, the bus priority control circuit 212 performs arbitration to raise the priority of the access.

As described in the first embodiment, if there is no auxiliary information in the auxiliary information cache 204 when reading the compressed data, it is necessary to read the auxiliary information from the memory 208 and generate a read request to read the compressed data by using the read auxiliary information. Therefore, if a delay occurs when reading the auxiliary information, an issuance of read request of the compressed data by the command conversion/data compression circuit 205 also delays, so that read latency increases.

In the configuration according to the present embodiment, the auxiliary information access determination circuit 210 determines whether or not an access address from the first arithmetic circuit 201_1 to the Nth arithmetic circuit 201_N is an address of auxiliary information, and when the access destination is an address of auxiliary information, the bus priority control circuit 212 performs arbitration to raise the priority of the access so that the auxiliary information is preferentially read from the memory 208.

By assigning a high priority to the access of the auxiliary information as described above, it is possible to shorten the read latency of the auxiliary information, so that the command conversion/data compression circuit 205 can issue a read command of compressed data with a small delay. Therefore, it is possible to reduce the read latency for reading the compressed data.

Third Embodiment

Figure 9:
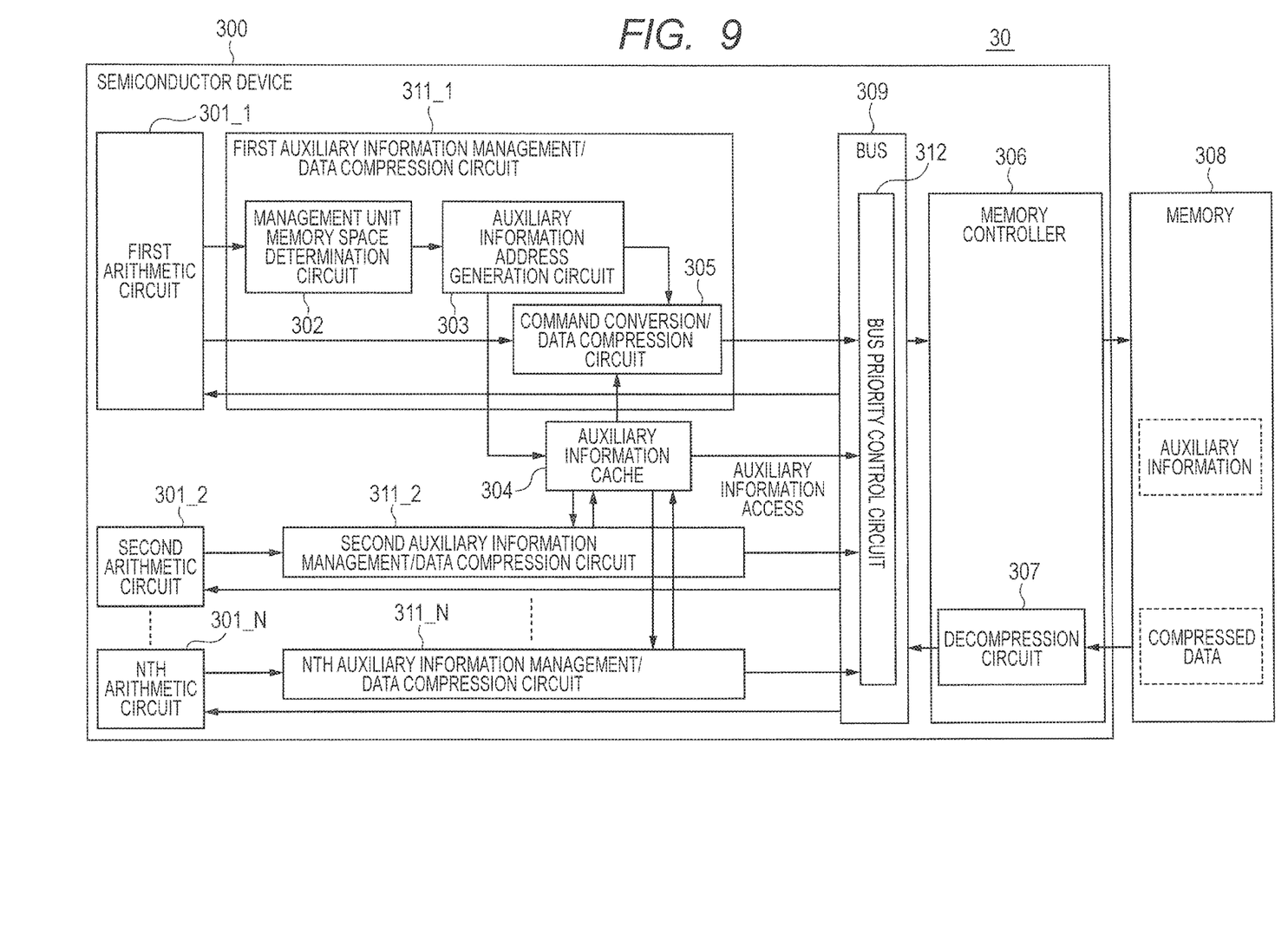
FIG. 9 is a diagram showing a configuration of a semiconductor system according to a third embodiment.

FIG. 9 is a diagram showing a configuration of a semiconductor system according to a third embodiment. The semiconductor system 30 shown in FIG. 9 includes a semiconductor device 300 and a memory 308. The semiconductor device 300 includes a first arithmetic circuit 301_1, a second arithmetic circuit 301_2, . . . , an Nth arithmetic circuit 301_N, a first auxiliary information management/data compression circuit 311_1, a second auxiliary information management/data compression circuit 311_2, . . . , an Nth auxiliary information management/data compression circuit 311_N, a bus 309 having a bus priority control circuit 312, and a memory controller 306 having a decompression circuit 307. In the first embodiment and the second embodiment, one auxiliary information cache 204 is provided to each of the first auxiliary information management/data compression circuit 211_1 to the Nth auxiliary information management/data compression circuit 211_N. On the other hand, in the present embodiment, different from the first and the second embodiments, one auxiliary information cache 304 is provided outside the first to Nth auxiliary information management/data compression circuits 311_1 to 311_N, and the first to Nth auxiliary information management/data compression circuits 311_1 to 311_N share the one auxiliary information cache 304. The auxiliary information cache 304 unitarily manages control of the auxiliary information during read accesses from a plurality of arithmetic circuits.

Each of the first auxiliary information management/data compression circuit 311_1 to the Nth auxiliary information management/data compression circuit 311_N has a management unit memory space determination circuit 302, an auxiliary information address generation circuit 303, and a command conversion/data compression circuit 305. Hereinafter, the first auxiliary information management/data compression circuit 311_1 will be described. However, the same goes for the second auxiliary information management/data compression circuit 311_2 to the Nth auxiliary information management/data compression circuit 311_N.

The management unit memory space determination circuit 302 determines an access destination management unit memory space 108A by using, for example, upper bits of an address, and outputs a determination result to the auxiliary information address generation circuit 303.

The auxiliary information address generation circuit 303 generates an auxiliary information address from the determination result from the management unit memory space determination circuit 302 and an access address, and in the case of read access, the auxiliary information address generation circuit 303 outputs a read request of auxiliary information to the auxiliary information cache 304. In the case of write access, the auxiliary information address generation circuit 303 outputs an access address for compressed data and the auxiliary information address to the command conversion/data compression circuit 305.

During read accesses, the auxiliary information cache 304 manages all auxiliary information generated by the first auxiliary information management/data compression circuit 311_1, the second auxiliary information management/data compression circuit 311_2, . . . , and the Nth auxiliary information management/data compression circuit 311_N. The auxiliary information address generation circuit 303 outputs an auxiliary information address to the auxiliary information cache 304 and checks whether there is auxiliary information corresponding to the auxiliary information address in the auxiliary information cache 304. When there is the corresponding auxiliary information, the auxiliary information address generation circuit 303 outputs the auxiliary information to the command conversion/data compression circuit 305, and when there is no corresponding auxiliary information, the auxiliary information address generation circuit 303 reads the auxiliary information from the memory 308 through the bus 309.

The command conversion/data compression circuit 305 performs command conversion, data compression processing, and management of auxiliary information during write access. The first arithmetic circuit 301_1 outputs data to the command conversion/data compression circuit 305. The command conversion/data compression circuit 305 issues a write request to the memory 308, compresses the data outputted by the first arithmetic circuit 301_1, and stores the compressed data in the memory 308. Further, the command conversion/data compression circuit 305 stores auxiliary information obtained by compressing the data to the auxiliary information address outputted from the auxiliary information address generation circuit 303.

Further, the command conversion/data compression circuit 305 converts an access length of a command based on a compressed data length which is auxiliary information. The command conversion/data compression circuit 305 stores the compressed data and the auxiliary information in the memory 308 through the bus 309.

The auxiliary information corresponding to the compressed data to be read is required for the arithmetic circuit to issue a read request, so that a low latency is required for read access of the auxiliary information. When the latency is large, issuance of the request is delayed, and the delay directly affects the latency of the read data. Therefore, the bus priority control circuit 312 receives accesses from the first to Nth auxiliary information management/data compression circuits 311_1 to 311_N and the auxiliary information cache 304, and performs arbitration by raising the priority of the access of the auxiliary information from the auxiliary information cache 304. In this way, a bus master of auxiliary information access is made individual, so that it is possible to reduce access determination processing in bus arbitration and easily perform priority control.

While the invention made by the inventors has been specifically described based on the embodiments, it is needless to say that the present invention is not limited to the embodiments described above and may be various modified.

What is claimed is:

1. A semiconductor device comprising:
an arithmetic circuit configured to access compressed data and auxiliary information required to access the compressed data;
a management unit memory space determination circuit; and
an auxiliary information address generation circuit configured to calculate an address of the auxiliary information,
wherein on a memory space where the compressed data and the auxiliary information are stored, at least one management unit memory space including a plurality of pieces of the compressed data and at least one auxiliary information storage area including a plurality of pieces of auxiliary information required to access the pieces of the compressed data are set,
wherein the management unit memory space determination circuit receives an access address to a first compressed data, which is one of the pieces of the compressed data, from the arithmetic circuit and determines in which management unit memory space the access address is stored,
wherein the auxiliary information address generation circuit generates a first auxiliary information address, which is an address where first auxiliary information corresponding to the first compressed data is stored, from a determination result of the management unit memory space determination circuit and the access address to the first compressed data,
wherein the arithmetic circuit performs access to the first compressed data by using the generated first auxiliary information address,
wherein in the auxiliary information address generation circuit, at least one pair of pieces of correspondence information indicating a correspondence relationship between the management unit memory space and the auxiliary information storage area is set, and
wherein the auxiliary information address generation circuit determines an auxiliary information storage area in which the first auxiliary information is stored from the determination result of the management unit memory space determination circuit and generates the first auxiliary information address by using the determination of the auxiliary information storage area and the access address.

2. The semiconductor device according to claim 1, wherein the pair of pieces of correspondence information is a pair of information indicating an address of the management unit memory space and information indicating an address of the auxiliary information storage area.

3. The semiconductor device according to claim 2, wherein the address of the management unit memory space is represented by using upper several bits of an address.

4. The semiconductor device according to claim 2, wherein the address of the auxiliary information storage area is a start point address of the auxiliary information storage area.

5. The semiconductor device according to claim 1, wherein a compressed data storage area where the pieces of the compressed data are stored is set in the management unit memory space, and when the access address is an access to the compressed data storage area, an auxiliary information address is generated.

6. The semiconductor device according to claim 1, wherein storage positions of the pieces of the compressed data in the management unit memory space and storage positions of the pieces of the auxiliary information corresponding to each of the pieces of the compressed data in the auxiliary information storage area are relatively coincident with each other.

7. The semiconductor device according to claim 1, wherein the auxiliary information is information of a data size of compressed data.

8. The semiconductor device according to claim 1,
wherein a plurality of the arithmetic circuits are provided,
wherein a command conversion/data compression circuit that compresses data outputted by the arithmetic circuits or generates auxiliary information of the compressed data is provided for each of the arithmetic circuits,
wherein an auxiliary information cache that reads and stores the auxiliary information that is generated by a plurality of the command conversion/data compression circuits and stored in a memory from the memory is provided, and a bus including a bus priority control circuit is provided between a set of the auxiliary information cache and the command conversion/data compression circuits and the memory, and
wherein the bus priority control circuit controls the bus by raising priority of an access from the auxiliary information cache.

9. The semiconductor device according to claim 8, wherein the command conversion/data compression circuits receive auxiliary information from the auxiliary information cache and issue a read request to the memory.

10. The semiconductor device according to claim 1, wherein the management unit memory space is allocated to an external memory.

11. A semiconductor device comprising:
an arithmetic circuit configured to access compressed data and auxiliary information required to access the compressed data;
a management unit memory space determination circuit;
an auxiliary information address generation circuit configured to calculate an address of the auxiliary information; and
a command conversion/data compression circuit,
wherein on a memory space where the compressed data and the auxiliary information are stored, at least one management unit memory space including a plurality of pieces of the compressed data and at least one auxiliary information storage area including a plurality of pieces of auxiliary information required to access the pieces of the compressed data are set,
wherein the management unit memory space determination circuit receives an access address to a first compressed data, which is one of the pieces of the compressed data, from the arithmetic circuit and determines in which management unit memory space the access address is stored,
wherein the auxiliary information address generation circuit generates a first auxiliary information address, which is an address where first auxiliary information corresponding to the first compressed data is stored, from a determination result of the management unit memory space determination circuit and the access address to the first compressed data,
wherein the arithmetic circuit performs access to the first compressed data by using the generated first auxiliary information address, and
wherein when a request issued from the arithmetic circuit is a read request for the first compressed data, the command conversion/data compression circuit reads the first auxiliary information and converts content of the read request by using the first auxiliary information.

12. The semiconductor device according to claim 11, wherein when the request issued from the arithmetic circuit is a write request of compressed data, the command conversion/data compression circuit compresses data outputted from the arithmetic circuit, generates a data size after the compression as auxiliary information, and converts content of the write request by using the generated auxiliary information.

13. The semiconductor device according to claim 11, further-comprising:
an auxiliary information cache, wherein the auxiliary information cache stores the auxiliary information generated by the command conversion/data compression circuit in association with an auxiliary information address generated by the auxiliary information address generation circuit.

14. A semiconductor device comprising:
an arithmetic circuit configured to access compressed data and auxiliary information required to access the compressed data;
a management unit memory space determination circuit; and
an auxiliary information address generation circuit configured to calculate an address of the auxiliary information,
wherein on a memory space where the compressed data and the auxiliary information are stored, at least one management unit memory space including a plurality of pieces of the compressed data and at least one auxiliary information storage area including a plurality of pieces of auxiliary information required to access the pieces of the compressed data are set,
wherein the management unit memory space determination circuit receives an access address to a first compressed data, which is one of the pieces of the compressed data, from the arithmetic circuit and determines in which management unit memory space the access address is stored,
wherein the auxiliary information address generation circuit generates a first auxiliary information address, which is an address where first auxiliary information corresponding to the first compressed data is stored, from a determination result of the management unit memory space determination circuit and the access address to the first compressed data,
wherein the arithmetic circuit performs access to the first compressed data by using the generated first auxiliary information address,
wherein a plurality of the arithmetic circuits are provided,
wherein a command conversion/data compression circuit that compresses data outputted by the arithmetic circuits or generates auxiliary information of the compressed data is provided for each of the arithmetic circuits,
wherein a bus including an auxiliary information access determination circuit and a bus priority control circuit is provided between a plurality of the command conversion/data compression circuits and a memory,
wherein the auxiliary information access determination circuit determines whether or not an access issued from the command conversion/data compression circuits is an access to auxiliary information stored in the memory, and
wherein when the auxiliary information access determination circuit determines that the access is an access to the auxiliary information, the bus priority control circuit controls the bus by raising priority of the access to the auxiliary information.

* * * * *